United States Patent

Chin-Long

Patent Number: 5,251,522
Date of Patent: Oct. 12, 1993

[54] PROTECTIVE APPARATUS PREVENTING LATHE TOOL FROM BREAKING

[76] Inventor: Wu Chin-Long, No. 136-12, Young Ho Road, Ta Ya Hsiang, Taichung Hsien, Taiwan

[21] Appl. No.: 970,385

[22] Filed: Nov. 2, 1992

[51] Int. Cl.⁵ .............. B23B 21/00; B23B 29/04; B23Q 15/007; B23Q 5/58
[52] U.S. Cl. .................. 82/134; 82/154; 82/158; 364/474.17; 364/474.19
[58] Field of Search .............. 82/132, 134, 136, 137, 82/139, 152, 154, 158, 160; 364/474.17, 474.19

[56] References Cited

U.S. PATENT DOCUMENTS

| | | | |
|---|---|---|---|
| 3,834,615 | 9/1974 | Watanabe et al. | 364/474.19 |
| 4,593,277 | 6/1986 | Langan | 364/474.17 |
| 4,620,281 | 10/1986 | Thompson et al. | 364/474.17 |
| 4,671,147 | 6/1987 | Komanduri et al. | 82/158 |
| 4,713,770 | 12/1987 | Hayes et al. | 364/474.17 |
| 4,736,625 | 4/1988 | Patterson et al. | 364/474.19 |
| 4,866,429 | 9/1989 | Granere | 364/474.17 |
| 4,893,532 | 1/1990 | Walburn et al. | 82/148 |

FOREIGN PATENT DOCUMENTS

| | | | |
|---|---|---|---|
| 077601 | 4/1988 | Japan | 82/160 |
| 744477 | 6/1980 | U.S.S.R. | 364/474.17 |

*Primary Examiner*—William E. Terrell
*Attorney, Agent, or Firm*—Browdy and Neimark

[57] ABSTRACT

An apparatus preventing a lathe tool from being damaged is composed of a lathe tool support provided thereon with a front chucking stand and a rear chucking stand, which are used to hold the lathe tool. The front chucking stand has an opening which receives the lathe tool and divides the front chucking stand into a first chucking block and a second chucking block. The first chucking block has a pivot shaft pivoted to the lathe tool support while the second chucking block has a thin strain gage attached to a surface thereof. The rear chucking stand has a front end with a through hole for receiving the rear end of the lathe tool and has a rear end having an actuating board welded thereto. The lathe tool support is provided with at least an electromagnet and a spring for pulling the actuating board. When the lathe tool is overloaded, the strain gage deforms to send out a signal to interrupt the power supply to the electromagnet so that the cutting edge of the lathe tool does an accelerated motion in an arcuate manner to move away from the work piece being lathed.

3 Claims, 2 Drawing Sheets

PROTECTIVE APPARATUS PREVENTING LATHE TOOL FROM BREAKING

BACKGROUND OF THE INVENTION

The present invention relates to lathe work, and more particularly to an apparatus serving to prevent a lathe tool from breaking during lathe machining.

The turning tool for use in lathe machining is commonly known as lathe tool for short. According to the prior art practice, the lathe tool is fastened securely on the lathe tool mount by means of a fastening means, such as a screw, so as to facilitate the cutting edge of the lathe tool to take contact with the work piece intended to be turned. However, the lathe tool is often vulnerable to an incident in which the lathe tool is bent or broken by an excessive force generated at such time when an improper feed amout of the lathe tool takes place or when the material quality of the work piece is uneven. The prevention of such incident as described above is generally done by visual detection of an experienced machine operator. At the present time, an apparatus for use in protecting the structural integrity of an overloaded lathe tool is not available. Such protective apparatus is especially needed by a lathe training organization, a lathe inspecting unit, a CNC lathe testing unit, etc., where the incident of the breakage of lathe tool is a frequent occurrence as well as a culprit responsible for the waste of many lathe tools and for inaccurate machining.

SUMMARY OF THE INVENTION

It is, therefore, the primary objective of the present invention to provide a protective apparatus capable of preventing a lathe tool from breaking by responding rapidly to withdraw the lathe tool from the work piece at such time when the lathe tool is under a stress that is greater than a predetermined range. The operation of the lathe is subsequently stopped to safeguard the lathe tool, the operator, and the machine.

It is another objective of the present invention to provide a protective apparatus, which is capable of preventing a lathe tool from breaking and is structured and designed simply and ingeniously for easy installation on a conventional lathe or a CNC lathe.

In keeping with the principles of the present invention, the foregoing objectives of the present invention are accomplished by a protective apparatus, which includes a lathe tool support upon which a front chucking stand and a rear chucking stand are mounted. The front and the rear chucking stands are used respectively for holding the front and the rear ends of a lathe tool. The front chucking stand is mounted on a pivot shaft to be able to turn sensitively in order that the cutting edge of the lathe tool remains at an appropriate eccentric distance in relation to the pivot shaft so as to accelerate its swiveling motion in an arcuate manner. Attached to the surface of the front chucking stand is a strain gage. The rear chucking stand is provided with an iron board and an electromagnet mounted on a tool support opposite to the surface of the iron board. The electromagnet is used to attract the iron board, which in turn keeps the rear chucking stand to remain at a first position which is a normal turning position. As soon as the lathe tool is exerted upon by a force, the front chucking stand and the strain gage are forced to deform slightly. If the deformation of the front chucking stand and the strain gage persists until such time when the quantity of the deformation exceeds a predetermined value, a signal is sent out and amplified so as to interrupt the power source of the electromagnet and the power source of the lathe motor. As a result, the rear chucking stand is forced to deflect to a second position by a force of a spring or another electromagnet which is charged, thereby resulting in the accelerated swiveling motion of the cutting edge of the lathe tool in an arcuate manner by making use of the pivot shaft as an eccentric axial center. Therefor, the cutting edge of the lathe tool moves away from the surface of the work piece so as to avert the breakage of the lathe tool.

The foregoing objectives, structures, functions and features of the present invention will be better understood by studying the following detailed description of a preferred embodiment of the present invention, in conjunction with the drawings provided herewith.

DETAILED DESCRIPTION OF THE PREFERRED EMBODIMENT

Figure 1:
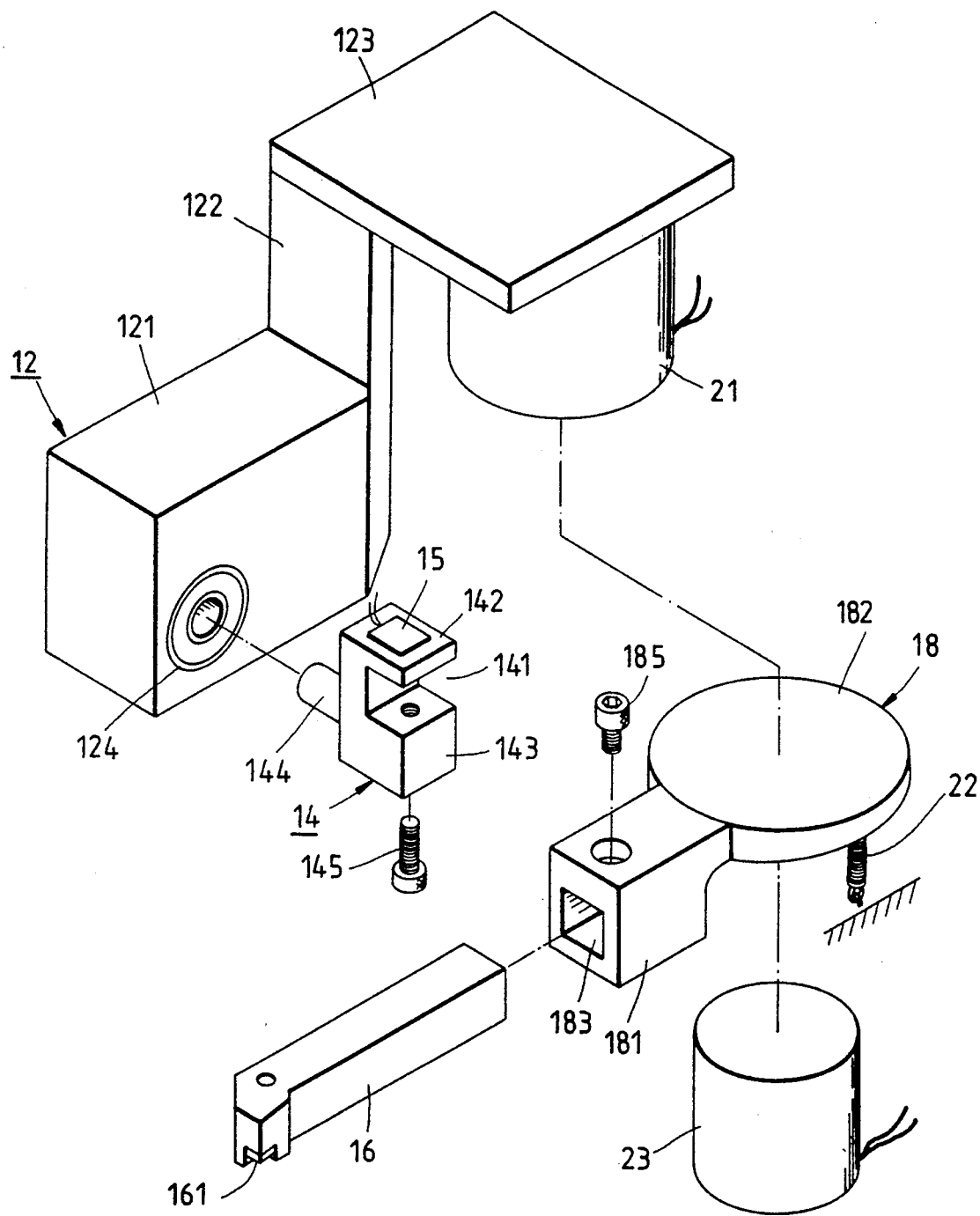
FIG. 1 shows an exploded view of a protective apparatus preventing the lathe tool from breaking, according to the present invention.
Figure 2:
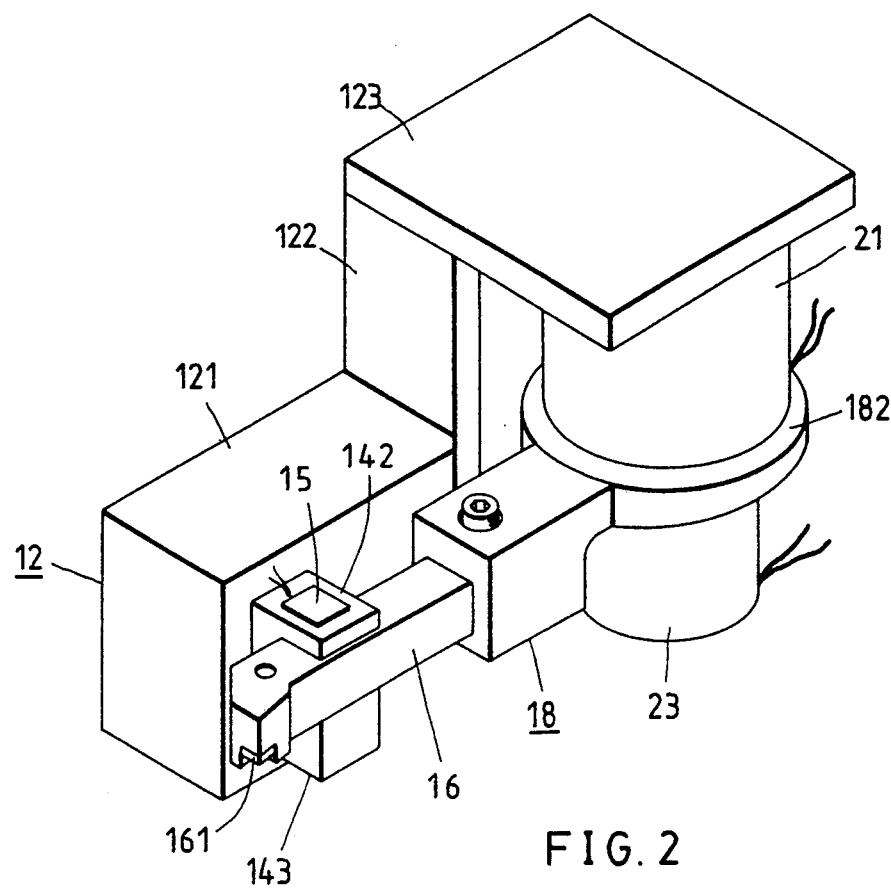
FIG. 2 shows a perspective view of the apparatus in combination of the present invention as shown in FIG. 1.

Referring to FIGS. 1 and 2, a protective apparatus preventing lathe tool from breaking of the present invention is shown to comprise a lathe tool support 12, a front chucking stand 14, a strain gage 15, a lathe tool 16, a rear chucking stand 18, an electromagnet 21, an auxiliary electromagnet 23, and a spring 22.

The lathe tool support 12 of a metal material has a base 121 and a brace 122 extending upwards from the end of the base 121. Attached to the top of the brace 122 is a support board 123. The front chucking stand 14 is of a block element having a C shape in its cross section and is provided with an opening 141 which divides the front chucking stand 14 into an upper chucking block 142 and a lower chucking block 143 having a pivot shaft 144 attached thereto and dimensioned to fit into a shaft bearing 124 of the base 121. As a result, the front chucking stand 14 is capable of turning actively and sensitively in relation to the base 121. The strain gage 15 is of a thin construction and is attached to the top surface of the upper chucking block 142. The lathe tool 16 is mounted securely in the opening 141 by means of a screw 145 which fastens in an upward manner. The rear chucking stand 18 comprises a rear chucking block 181 provided at rear end thereof with an actuating board 182 welded thereto. The rear chucking block 181 is provided at the center thereof with a through hole 183 for receiving the lathe tool 16, which is then fastened by means of a screw 185. The actuating board 182 is made of iron and can be therefore attracted by a magnetic force. The electromagnet 21 is attached to the underside of the support board 123 for attracting the actuating board 182 so as to keep the late tool 16 to remain at a normal turning position. The spring 22 and the auxiliary electromagnet 23 are mounted respectively to the underside of the actuating board 182 for pulling the actuating board 182 downwards so as to cause the rear end of the lathe tool 16 to move downwards. Such downward movement of the rear end of the lathe tool 16 brings about an accelerated movement of the cutting edge of the lathe tool 16 away from the work piece positioned to be lathed.

Figure 3:
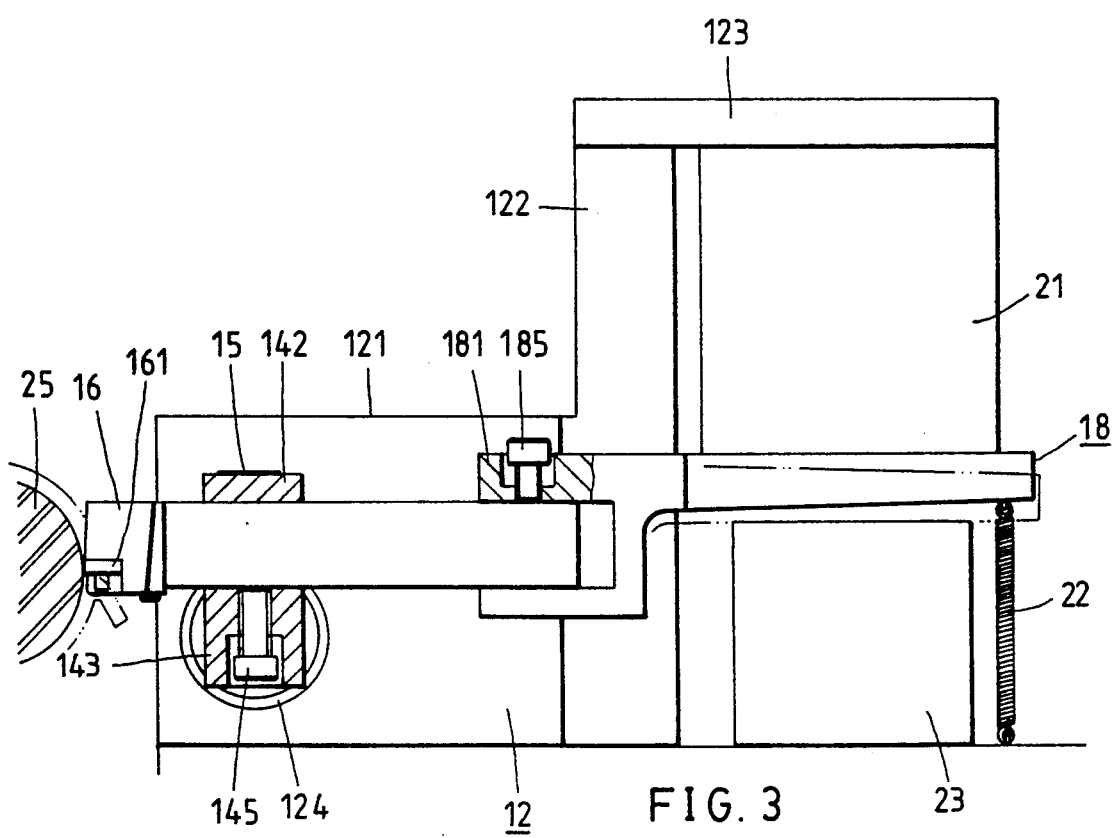
FIG. 3 is a schematic view showing the apparatus of the present invention in operation.

The lathe tool 16 is attached securely to the underside of the upper chucking block 142 by means of the screw 145. The upper chucking block 142 is constructed in a way that it is so thick and flexible as to permit it to deform under pressure of a certain magnitude. As a result, the upper chucking block 142 is forced to deform at such time when the upper chucking block 142 is exerted upon by an excessive force generated by an improper turning of the lathe tool 16. The strain gage 15 is also forced to deform and to change its resistance value, which is then picked up, amplified and compared by a control circuit. If the strain value of the strain gage happens to be greater than a predetermined value, the electromagnets 21 and 23 may be either activated or inactivated. The operations of the present invention are expounded hereinafter in conjunction with FIG. 3.

When a normal turning is under way, the power supply to the electromagnet 21 is turned on, thereby resulting in the actuating board 182 to be attracted and held by the electromagnet 21. The rear chucking stand 18 is therefore situated at a dead center predetermined position, and the lathe tool 16 is held by the front and the rear chucking stands 14 and 18 so as to remain at a horizontal turning position. As a result, the cutting edge 161 of the lathe tool 16 keeps working on the work piece 25. However, when the feed amount of the lathe tool 16 is excessive, or when the work piece is excessively rigid, the lathe tool 16 moves upwards to force the upper chucking block 142 to deform. The deformation of the upper chucking block 142 results in a subsequent deformation of the strain gage 15. The internal resistance value of the deformed strain gage 15 is subsequently increased and is thereafter converted by a control circuit into a voltage value, which is then picked up, amplified and compared. If such value of the internal resistance of the strain gage 15 is greater than a predetermined value, the power supply to the electromagnet 21 and to the lathe motor is interrupted at once. In the meantime, the power supply to the auxiliary electromagnet 23 is turned on so as to attract and pull down the actuating board 182, in cooperation with the spring 22, thereby resulting in the front chucking block 14 to swivel on the pivot shaft 144 serving as an axial center. As a result, the cutting edge 161 deflects upwards and outwards in an arcuate manner so as to move away from the surface of the work piece 25 and to terminate immediately the lathe work. Therefore, the risk that the lathe tool 16 is damaged is averted effectively. The deformation value of the strain gage 15 can be so adjusted as to suit the nature of the lathe work as well as the kinds of the lathe tool and the work piece to be worked on a lathe.

The embodiment of the present invention described above is to be regarded in all respects as merely illustrative and not restrictive. Accordingly, the present invention may be embodied in other specific forms without deviating from the spirit thereof. For examples, the embodiment described above includes the cutting edge 161 of the lathe tool 16 which turns downwards. Such downward turning of the cutting edge 161 can be so modified that the cutting edge 161 turns upwards by means of an arrangement that the support board 123 and the electromagnet 21 are mounted under the actuating board 182 and that the auxiliary electromagnet 23 and the spring 22 are mounted over the actuating board 182. The spring 22 may be of a compression spring and located on the same side as the electromagnet 21. The present invention may be devoid of the auxiliary electromagnet 23 if the spring 22 affords a sufficient actuating force. The present invention is therefore to be limited only by the scope of the hereinafter appended claims.

What is claimed is:

1. A protective apparatus preventing lathe tool from breaking comprising a lathe tool support having a front chucking stand and a rear chucking stand mounted thereon; wherein said front chucking stand is provided with an opening which is used for receiving and locking said lathe tool and is used to divide said front chucking stand into a first chucking block and a second chucking block, said first chucking block having a pivot shaft pivoted to said lathe tool support, said second chucking block having an inner surface making contact with said lathe tool and an outer surface with a strain gage attached thereto; wherein said rear chucking stand has a through hole located at the front end thereof for receiving and locking the rear end of said lathe tool and has an actuating board attached to the rear end thereof; wherein said lathe tool support is provided with at least an electromagnet and a biasing means, which are opposite in location to said actuating board; and wherein said strain gage deforms, at such time when said lathe tool is overloaded, to send out a signal to regulate the power supply to said electromagnet in order that said actuating board is triggered to move from a first position to a second position so as to cause a cutting edge of said lathe tool to do an accelerated motion in an arcuate manner to move away from a work piece being lathed.

2. The protective apparatus preventing lathe tool from breaking according to claim 1 wherein said opening of said front chucking stand and said pivot shaft are eccentric so that said lathe tool and said pivot shaft always remain at relatively eccentric positions.

3. The protective apparatus preventing lathe tool from breaking according to claim 1 wherein said lathe tool support is provided with said electromagnet opposite in location to one side of said actuating board and with an auxiliary electromagnet opposite in location to another side of said actuating board, with said electromagnet intended to keep said actuating board at said first position at which a normal turning of said lathe tool takes place, and with said auxiliary electromagnet intended to keep said actuating board at said second position at such time when the power supply to said electromagnet is interrupted.

* * * * *